United States Patent [19]
Touchton et al.

[11] Patent Number: 5,870,973
[45] Date of Patent: Feb. 16, 1999

[54] ELECTRONIC ANIMAL CONTROL SYSTEM TRANSMITTER WITH VARIABLE PHASE CONTROL

[75] Inventors: Scott F. Touchton, Malvern, Pa.; Donald L. Peinetti, La Jolla, Calif.

[73] Assignee: Invisible Fence Company, Inc., Malvern, Pa.

[21] Appl. No.: 652,695

[22] Filed: May 30, 1996

[51] Int. Cl.⁶ .................................................. H01K 15/04
[52] U.S. Cl. .......................... 119/721; 119/720; 119/859
[58] Field of Search .................................... 119/720, 721, 119/859

[56] References Cited

U.S. PATENT DOCUMENTS

| | | |
|---|---|---|
| 3,753,421 | 8/1973 | Peck . |
| 3,794,941 | 2/1974 | Templin ...................................... 333/17 |
| 3,835,379 | 9/1974 | Templin ................................. 324/58 B |
| 4,967,695 | 11/1990 | Giunta . |
| 5,053,768 | 10/1991 | Dix . |
| 5,425,330 | 6/1995 | Touchton et al. . |
| 5,435,271 | 7/1995 | Touchton et al. . |
| 5,445,900 | 8/1995 | Miller et al. . |
| 5,476,729 | 12/1995 | Miller et al. . |
| 5,533,469 | 7/1996 | Touchton et al. . |

*Primary Examiner*—John S. Hilten
*Attorney, Agent, or Firm*—Dann, Dorfman, Herrell and Skillman, P.C.

[57] ABSTRACT

A transmitter for an electronic animal control system of the type employing a boundary wire antenna for radiating a predetermined radio frequency signal, is provided with phase detection circuitry for detecting a phase difference between the applied radio frequency signal and the electrical current within the antenna. Phase control circuitry is provided for adjusting the phase of the voltage with respect to the current in response to detecting a phase difference.

1 Claim, 4 Drawing Sheets

# ELECTRONIC ANIMAL CONTROL SYSTEM TRANSMITTER WITH VARIABLE PHASE CONTROL

FIELD OF THE INVENTION

The present invention relates to a transmitter for an electronic animal control system having a variable phase control for adapting the transmitter to various lengths of antennae.

BACKGROUND OF THE INVENTION

Electronic animal control systems are known for confining an animal to a selected area, or to otherwise control the movement of an animal relative to a selected area. For example, such systems as are manufactured by the Invisible Fence Company of Malvern, Pa. have become a popular alternative to traditional fencing for confining animals in residential areas.

In an electronic animal control system, an antenna in the form of a wire is positioned to define the boundary of the selected area. Typically, the wire is laid underground along the perimeter of the area. The wire is connected to a radio frequency signal generator so that a radio frequency signal is radiated from the wire. A receiver for receiving and detecting the radio frequency signal is mounted upon the animal. The receiver includes a transducer, such as a speaker or a mild electric shock generator, for applying a corrective stimulus to the animal in the vicinity of the wire. Such systems, and components thereof, are described in U.S. Pat. Nos. 5,425,330; 5,435,271; 4,996,945; and 4,967,695.

A desirable application for electronic animal control systems is to confine dogs or other carnivores within an agricultural area, such as a farm or orchard, for the purpose of discouraging rodents, deer, or other herbivores from consuming crops in the area. Such agricultural areas tend to be larger than residential areas, and hence require longer boundary antennae. For example, a typical residential installation may require a boundary wire antenna of a few hundred meters, while an agricultural installation may require several kilometers of wire.

With increasing length of the antenna, however, it becomes difficult to efficiently transfer the desired radio frequency signal from the signal generator to the antenna. One difficulty is that the distributed series inductance and the distributed parallel capacitance of the antenna can cause undesirable resonant oscillation that may interfere with operation of the animal control system. Another related problem is that the series inductance of the antenna can reduce the peak current in the antenna, and hence reduce the strength of the radiated signal.

One way to counteract the problems associated with using longer boundary wires would be to provide a capacitance in series with the output terminal of the signal generator, in order to cancel the series-inductive component of the distributed reactance of the boundary wire antenna. However, because each installation of an animal control system differs from other installations in terms of wire length, geometry, and soil conditions, a single capacitance cannot be selected to compensate for the series inductance under all conditions. Consequently, it has been necessary to provide skilled installation personnel to measure the relevant electrical parameters of each installation and to custom modify the signal generator to obtain the desired compensation. Aside from being expensive and inconvenient, it is then necessary to re-tune the signal generator whenever a critical parameter of the animal control system, such as the size or shape of the area, is desired to be changed.

In view of the difficulties of custom tuning a large-area electronic animal control system, and of maintaining such a system in tune, it would be desirable to provide a signal generator for such a system that would be capable of detecting whether the antenna current is in phase with the voltage applied by the signal generator, for indicating a degree to which the voltage and current are out of phase, and for providing a phase adjustment feature for correcting any detected phase difference. Such a signal generator would desirably achieve these objectives in a manner requiring little or no special skills or training on the part of the user.

SUMMARY OF THE INVENTION

In accordance with one aspect of the present invention, there is provided a transmitter for an electronic animal control in which control circuitry compares the relative phase of the applied radio frequency voltage and the electrical current within the boundary wire antenna. The transmitter further includes phase control means for selecting a capacitance to be connected in series between the signal generator and the boundary wire antenna, in order to compensate for the inductive reactance of the antenna.

In accordance with another aspect of the present invention, a transmitter for an electronic control system is provided with control circuitry for detecting and signaling a malfunction of the boundary wire antenna, such as may be manifested by an overpowered or underpowered operating condition. The transmitter is further configured to operate in a first mode for animal confinement, wherein the signal applied to the boundary wire antenna is a differential signal between two output terminals connected with the antenna. In a second mode of operation, a break detection signal is applied between one of the terminals and earth ground for facilitating location of a break in the boundary wire antenna.

In accordance with another aspect of the invention, an improved lightning arrestor circuit is provided for a transmitter for an electronic animal control system.

BRIEF DESCRIPTION OF THE DRAWINGS

The foregoing summary as well as the following detailed description of the preferred embodiments of the present invention will be better understood when read in conjunction with the appended drawings, in which.

DETAILED DESCRIPTION OF THE PREFERRED EMBODIMENTS

Figure 1:
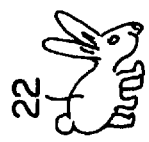
FIG. 1 is a diagram of an animal control system having a transmitter according to the present invention.
Figure 1:
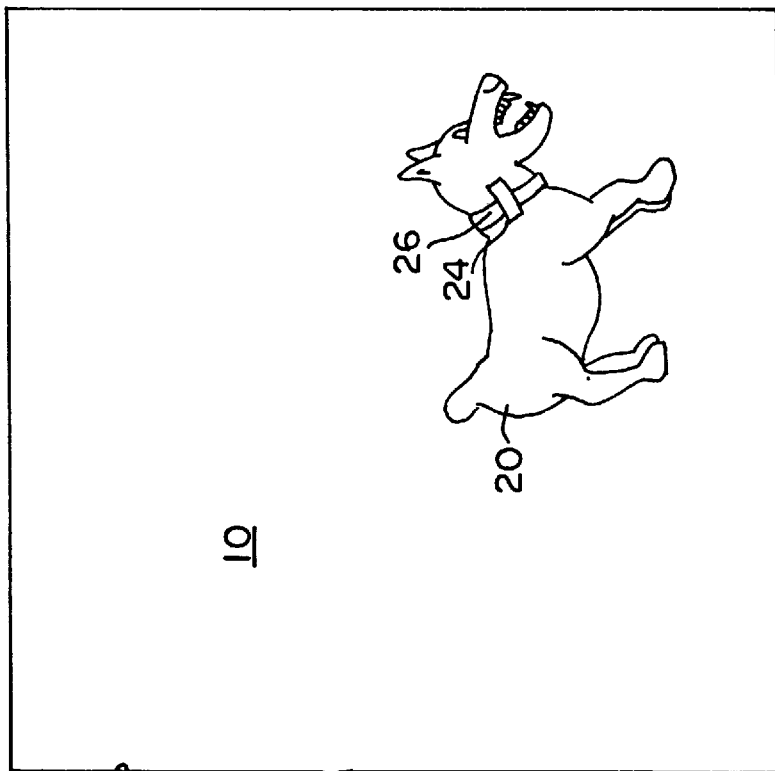
Figure 1:
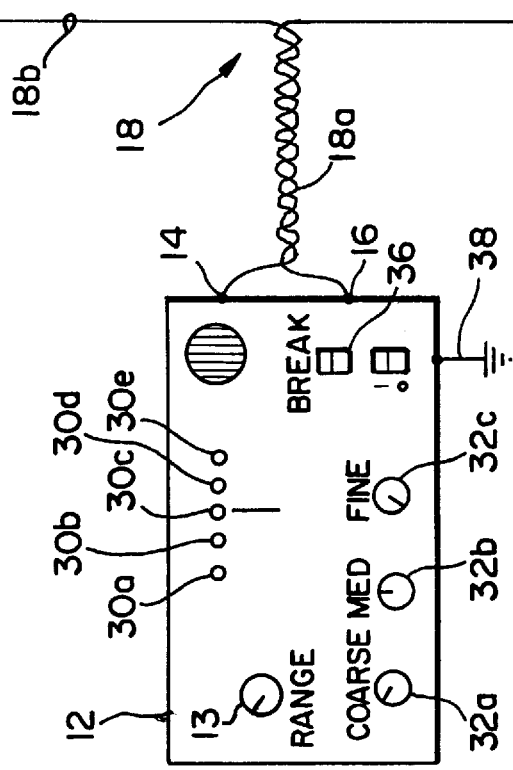

Referring now to FIG. 1, there is shown an electronic animal control system for controlling the movement of animals relative to an agricultural area 10. The control system comprises a transmitter 12 for generating a predetermined radio frequency signal across a pair of output terminals 14 and 16. Respective ends of a boundary wire antenna 18 is connected to the terminals 14 and 16. The antenna 18 includes a twisted-pair portion 18a and a loop portion 18b. The radio frequency signal is substantially confined between the conductors of the twisted pair portion 18a, and is radiated from the loop portion 18b. The loop portion 18b extends around the perimeter of the area 10 to define a boundary in which a dog 20 or other carnivore is desired to be confined for the purpose of discouraging herbivores, such as rabbit 22, from entering or remaining within the area 10. A receiver 24 is mounted upon the dog 20 by a collar 26. The receiver 24 is configured to detect the radio frequency signal radiated by the boundary wire 18, and to apply a corrective stimulus to the dog 20 when the dog 20 approaches the vicinity of the boundary wire 18. The proximity to the wire 18 at which the stimulus will be applied can be controlled by the user, by adjustment of a range selector control 13 mounted upon the transmitter 12.

The transmitter 12 includes indicators, such as light-emitting diodes (LED) 30a–e for indicating whether the electrical current within the boundary wire 18 is in phase with the voltage applied by the transmitter, and for indicating whether the current is leading or lagging the applied voltage. Preferably, the center LED 30c is a green LED which, when illuminated, indicates that the current is sufficiently in phase with the voltage for efficient operation (within about 10%). LEDs 30a and 30b are positioned in line to the left of the center LED 30c and indicate, when illuminated, that the current leads the voltage. LED 30a is illuminated when the current leads the voltage by a greater phase difference than when LED 30b is illuminated, thus providing a proportionate graphical display of the phase difference between the current and the voltage. Similarly, LEDs 30d and 30e provide a graphical display of the existence and degree of a condition in which the current lags the voltage.

In order to compensate for a phase-leading or a phase-lagging condition, phase adjustment controls 32a–c are provided. The phase adjustment controls provide coarse 32a, medium 32b and fine 32c adjustment of a series capacitance that is connected within the transmitter 12 in series with the boundary wire 18, as described further hereinbelow.

The transmitter 12 further includes a speaker 34 for audibly indicating certain operating conditions, such as insufficient or excessive electrical current within the boundary wire. Such audible indications may comprise distinct audible tones or tone sequences in combination with distinctive patterns of illuminated LEDs for identifying the respective operating conditions. If the boundary wire current is insufficient, the user may increase the range adjustment control until such a condition is no longer indicated. If the maximum range adjustment is reached, and an insufficient boundary wire current is indicated, then such a circumstance would indicate that the boundary wire is not properly connected to the transmitter, or has been broken. In order to facilitate locating and repairing breaks in the boundary wire, the transmitter 12 includes a selector switch 36 for causing the transmitter 12 to operate in a wire break location mode.

Preferably, during normal operation, the transmitter produces a square wave carrier signal at about 3,500 Hz, modulated by a 25% duty cycle 30 Hz square wave. Such a sub-broadcast frequency is lower than that used in traditional animal control systems, in order to avoid undesirable resonant oscillations in the boundary wire antenna that may occur at higher frequencies. Hence, as used herein, the term "radio frequency" refers generally to a frequency of operation capable of producing a sufficient amplitude of radiated electromagnetic waves from the antenna for effecting operation of the receiver 24 to control the animal. During normal operation, the voltage applied to the boundary wire antenna "floats" with respect to earth ground (i.e., the generated signal is provided as a differential signal between the terminals 14 and 16, neither of which is connected to earth ground 38). During the wire break location mode of operation, one of the terminals 14 and 16 is connected to earth ground, and the other terminal is provided with a 7,500 Hz signal to facilitate location of a wire break by the user travelling along the loop 18b with a signal strength meter tuned to 7,500 Hz, and seeking a location at which the detected signal is diminished relative to other locations along the wire. Alternatively, the 7,500 Hz signal may be applied between a selected one of terminals 14 and 16 and earth ground. A grounding rod 38 is provided to connect the transmitter 12 to earth ground.

Figure 2:
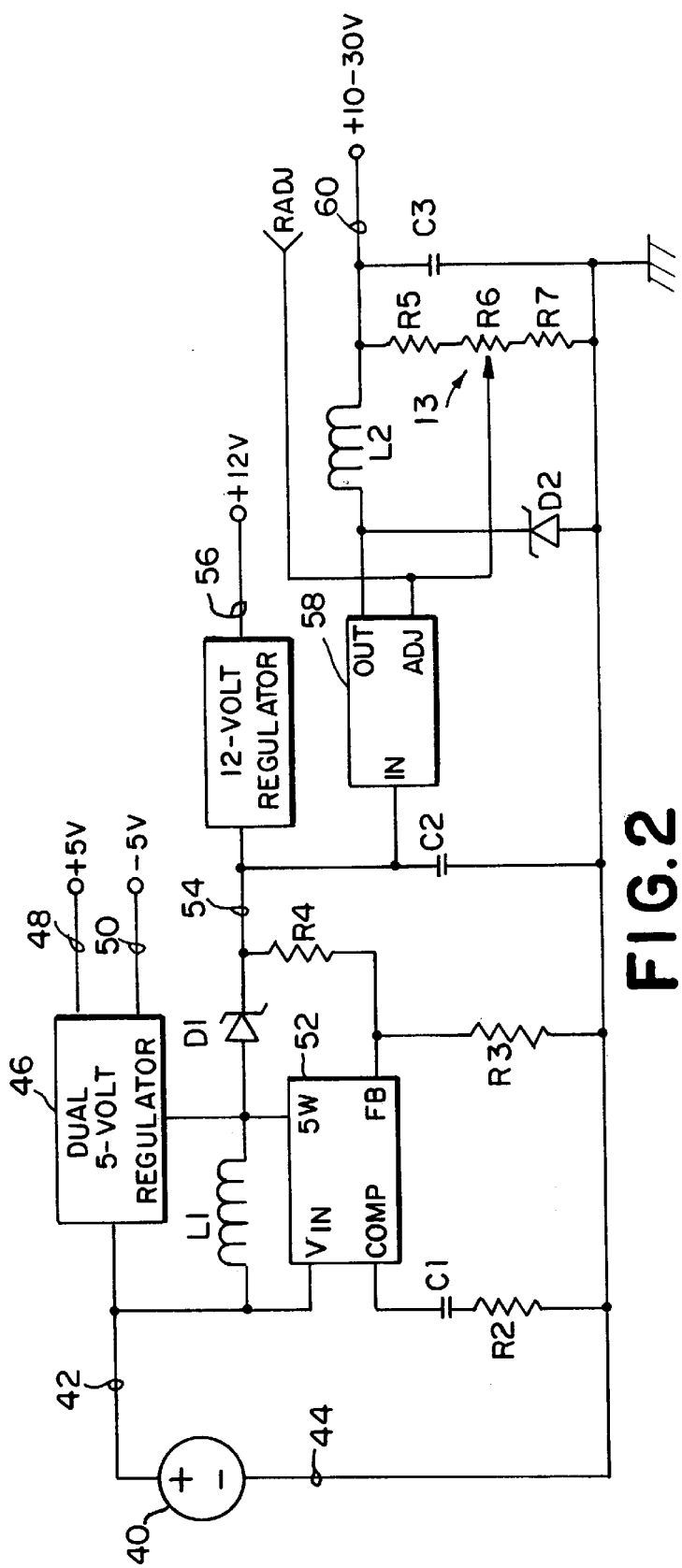
FIG. 2 is a schematic diagram of electrical supply circuitry and the transmitter of FIG. 1.
Figure 3:
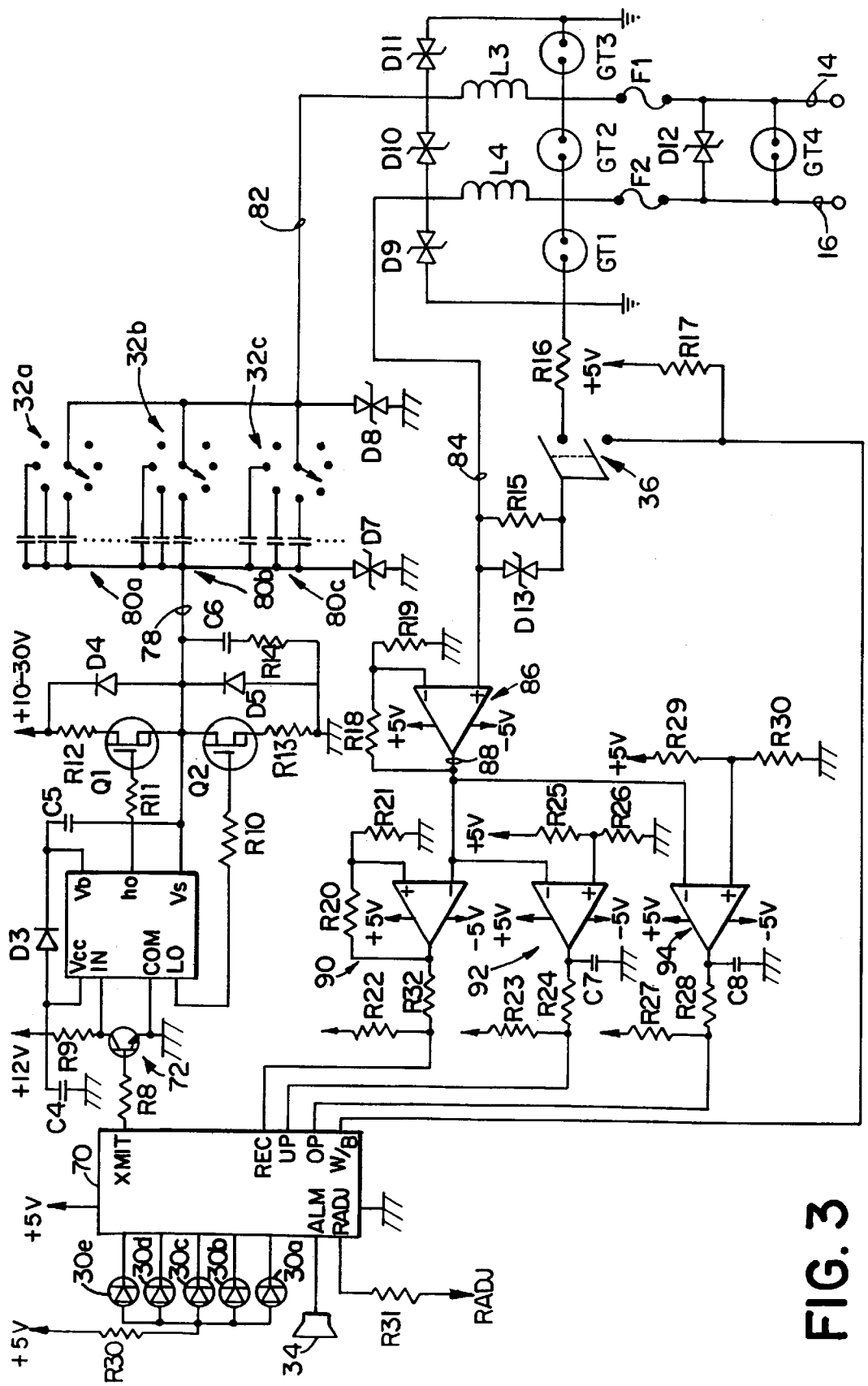
FIG. 3 is a schematic diagram of the signal generation and control circuitry of FIG. 1.

Referring now to FIG. 2, there is shown a schematic diagram of power regulation circuitry employed within the transmitter 12. The relevant electrical parameters or identification numbers of the components shown in FIGS. 2 and 3, are listed in Table 1. A DC power source 40, such as a battery, a rectified AC supply, a solar panel, or the like, is connected to provide about 12–14 DC volts between terminal 42 and chassis ground terminal 44. The DC power source 40 is preferably regulated and thermally compensate to deliver a stable voltage of between about 9 volts and 14 volts.

The power supply circuitry preferably includes several voltage regulators for supplying voltages required by various components of the transmitter. For example, a dual 5 volt regulator 46 is connected with terminal 42 for supplying regulated voltages of 5 volts and −5 volts, relative to chassis ground, at terminals 48 and 50. An LM2577 step-up voltage regulator 52 is connected with terminal 42 and is appropriately biased to provide a voltage of 30 volts at terminal 54. A 12 volt regulator is connected with terminal 54 to provide a regulated 12 volts DC at terminal 56. An IM2575 adjustable step-down voltage regulator 58 is connected with terminal 54 to provide an adjustable peak DC voltage of between about 10 volts and 30 volts at terminal 60 for driving the antenna 18. The voltage supplied at terminal 60, which is consequently modulated and applied to the boundary wire antenna, is determined by the range adjustment control 13. Additionally, the adjustment signal input terminal of regulator 58 is connected to receive an automatic range adjustment control signal, RADJ, which, when grounded, causes the voltage regulator 58 to produce the maximum output voltage of 30 volts independent of the setting of the manual range adjustment control 13.

Referring now to FIG. 3, there is shown a schematic diagram of the transmitter circuit which is powered by the power supply circuitry of FIG. 2. Operation of the transmitter circuit is governed by a PIC16C57 microcontroller 70 operating at 4 MHz and a supply voltage of 5 volts relative to chassis ground.

The signal to be provided to the boundary wire antenna is generated in response to a 5 volt logic-level square wave signal produced by the microcontroller 70 at I/O terminal XMIT. An amplifier 72 is connected to the 12 volt supply to receive the logic level signal and to amplify the signal to an intermediate peak level of 12 volts. The amplified signal is provided to the input terminal (IN) of an IR2111 transistor driver, which generates complementary drive signals (HO and LO) that are provided to the gate terminals of a pair of N-channel field-effect transistors Q1 and Q2. The transistors Q1 and Q2 are connected in series with the adjustable 10–30 volt supply. The resulting 10–30 volt square wave antenna driving signal is provided at terminal 78.

The phase adjustment controls 32a–c comprise selector switches which connect a selected parallel combination of capacitors from among respective capacitor banks 80a–c in series with the 10–30 volt antenna driving signal at terminal 78. The capacitor banks 80a–c are arranged such that control 32a can be operated to select a coarse range of capacitances from 0.1 μF–0.68 μF, control 32b can be operated to select a medium range from 0.033 μF–0.47 μF, and control 32c can be operated to select a fine range from 0.0022 μF–0.047 μF. The 10–30 volt antenna driving signal passes through the selected parallel combination of capacitors to terminal 82, through choke coil L3 and fuse F1, and then to antenna terminal 14.

Figure 5:
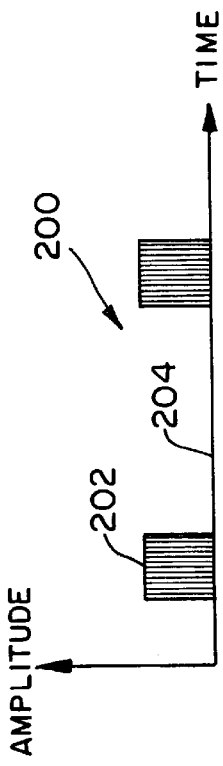
FIG. 5 is a graph of a radio frequency signal generated by the transmitter of FIG. 1.

Referring to FIG. 5, the normal operating transmitter signal 200 is characterized by an active interval 202 and an inactive interval 204. The active interval 202 comprises 32 cycles of a square wave signal having a pulse width of 141 μs, thus providing a frequency of about 3550 Hz and an active interval of about 9 ms. The inactive interval 204 has a duration of about 24 ms, thus providing the approximately 30 Hz 25% duty cycle modulation of the 3550 Hz carrier.

Referring to FIG. 3, the return signal from the boundary wire antenna arrives at terminal 16, and passes through fuse F2 and choke coil L4 to terminal 84. Terminal 84 is connected to chassis ground by a 1 Ω sense resistor R15. The break mode selector switch 36 comprises a single-pole double-throw switch that is maintained in the open position during normal operation. Hence, the voltage across sense resistor R15 is proportional to the instantaneous antenna current received at terminal 16.

A linear amplifier 86 is connected to amplify the voltage present at terminal 84, and to provide a proportional voltage signal of the antenna return current to terminal 88. The proportional signal at terminal 88 is connected to the input terminals of saturating amplifiers 90, 92, and 94.

Amplifier 90 provides a saturating signal to an input terminal of the microcontroller 70 designated REC, to allow the microcontroller 70 to compare the relative phase of the applied voltage signal, XMIT, with the phase of the return current. Amplifier 92 is configured as a comparator for comparing the relative amplitude of the return current with a reference voltage determined by R25 and R26. The resistors R25 and R26 are selected to form a voltage divider such that when the return current is less than 100 mA, the output of amplifier 92 will be driven to a low level. An averaging capacitor C7 is connected to the output terminal of amplifier 92, so that the resulting signal provided to the UP input terminal of the microcontroller 70 will be driven low when the return current remains below a predetermined threshold for a predetermined time interval.

Amplifier 94 is also configured to compare the relative amplitude of the return current with a predetermined reference voltage greater than the reference voltage supplied to amplifier 92, to allow the microcontroller 70 to detect excessive current within the boundary wire antenna. As long as the relative current signal remains below the predetermined reference level, the output of amplifier 94 remains at a low level. If the return current exceeds the predetermined threshold for a period of time determined by averaging capacitor C8, then the OP input terminal of microcontroller 70 will be driven to a high level.

As noted previously, the signal supplied to the boundary wire antenna is a floating signal relative to earth ground. When the break location mode of operation is desired, switch 36 is closed in order to connect the chassis ground to earth ground via a 100 Ω resistor R16. Simultaneously, the input terminal W/B of the microcontroller 70, which is ordinarily held high by a pull-up resistor R17, is driven low to allow the microcontroller 70 to determine the state of switch 36 and to then operate in wire break location mode.

LEDs 30a–e are connected to respective I/O terminals of the microcontroller 70, so that the microcontroller 70 may illuminate any of the LEDs 30a–e by driving the corresponding I/O terminal to a low logic level. Preferably, the I/O terminals are arranged as a single latching register, so that the microcontroller 70 may light any combination of LEDs 30a–e by writing a single binary word to the register. Such illumination will be maintained until subsequent word is written to the register.

Lightning protection for the transmitter includes an arrangement of spark gap tubes GT1–4, choke coils L3 and L4, and transient suppression diodes D9–11, arranged as described in U.S. Pat. No. 4,996,945, which is incorporated by reference herein. Because of the tendency of large antenna loops to induce large transient responses to nearby lightning strikes, an additional threshold voltage conduction device, such as transient suppression diode D12, is added between the antenna terminals for additional transient current conducting capacity. Additionally, transient suppression diodes D8 and D13 are connected between respective terminals 82 and 84 to chassis ground. Hence, threshold voltage conduction paths are provided between the antenna terminals by GT4, D12 and D10; from each antenna terminal to earth ground by GT1, D9, GT3 and D11; and from each antenna terminal to chassis ground (through choke coils L3 and L4) by D8 and D13. A further threshold voltage conduction device D7 is provided between chassis ground and terminal 78, so that each side of capacitor banks 80a–c is provided with a transient conduction path in the event that a voltage transient on terminal 82 produces a reactive impulse at terminal 78 due to the dV/dt current/voltage relationship of the capacitors. The diode D7 will become conductive in the event that such an impulse at terminal 82 cannot be arrested by diode D4 for providing a conductive path to 30 volts for positive impulses or by diode D5 for providing a conductive path to chassis ground for negative impulses.

Figure 4:
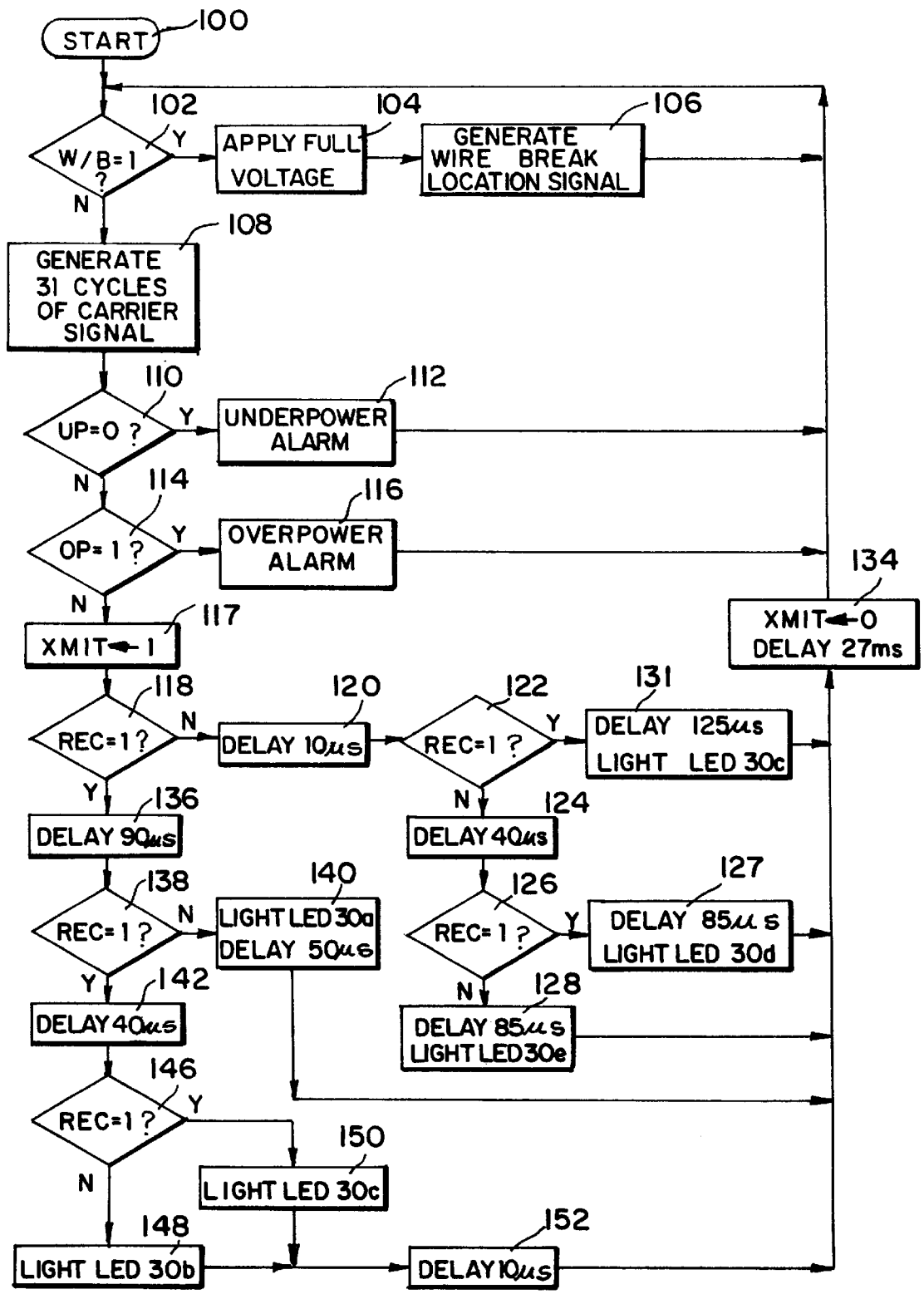
FIG. 4 is a logical flow diagram of a control process performed by the transmitter of FIG. 1.

The sequence of operations performed by microcontroller 70 to effect control of the transmitter shall now be described with reference to FIG. 4. Where reference is made to particular time delay intervals, it should be understood that such time delay intervals may require adjustment to compensate for the finite time cycles required by the microcontroller to execute such time delays in addition to other branching or processing steps.

Beginning at step 100, microcontroller proceeds to step 102 wherein it is determined whether the wire break mode switch 36 is closed. If, in step 102 it is determined that wire break location mode is selected, then the microcontroller 70 proceeds to step 104, otherwise control passes to step 108.

In step 104, the microcontroller 70 overrides the manual range adjustment by driving the output terminal RADJ low, thus causing the adjustable voltage regulator 58 to apply the full 30 volt maximum supply level to the boundary wire driving transistors Q2 and Q3. Then, in step 106, the microcontroller 70 generates a burst of the 7500 Hz wire break location signal by alternatively driving the XMIT terminal high for about 67 μs and then low for 67 μs, for a period of about one second. Then the controller resets the boundary wire supply voltage to its manual setting and returns to step 102.

In step 108, the microcontroller generates 31 cycles of the predetermined carrier signal by alternately toggling the XMIT terminal on and off for successive 139 μs interval.

Such intervals, along with the execution time required by looping instructions, produce the desired 141 µs square wave pulses. The microcontroller 70 exits step 108 at the end of the 31st cycle—i.e., about 139 µs after turning the XMIT terminal off. Then, the microcontroller proceeds to step 110.

In step 110, the microcontroller determines whether the UP terminal is asserted, indicating an underpowered condition in the boundary wire antenna. If, in step 110, the UP terminal is not asserted, then the microcontroller proceeds to step 114. If, in step 110, the UP terminal is asserted, the microcontroller proceeds to step 112.

In step 112, an appropriate alarm is generated to signal to the user that excessively low current has been returned from the boundary wire. For example, the microcontroller may generate a distinctive audio or visual indication using LEDs 30a–e, speaker 34, or other such indicator devices as may be connected to the I/O terminals of the microcontroller. The alarm indication is preferably generated for a time period of about a second. Then, the microcontroller returns to step 102. Hence, if the current within the boundary wire antenna is below the predetermined acceptable threshold level, the alarm indication will be continued due to repeated execution of step 112.

In step 114, the microcontroller determines whether the OP terminal is asserted, indicating that the return current from the boundary wire antenna is above the predetermined acceptable threshold level. If, in step 114, no overpower condition is detected, then the microcontroller proceeds to step 117. If an overpower condition is detected in step 114, then the controller proceeds to step 116.

In step 116, the microcontroller produces an appropriate alarm indication to signal an overpower condition. The alarm is preferably generated as described in connection with step 112, but the combination of tones or illuminated LEDs is distinct from that produced in step 112. Then the microcontroller returns to step 102. As long as an overpower condition continues to be detected, the transmitter will generate bursts of the desired antenna signal at one-second intervals by repeated execution of step 108 and 116. When the overpower condition is corrected, the transmitter will resume normal operation.

In step 117, the microcontroller asserts the XMIT terminal to begin generation of a 32nd carrier cycle. Then, the microcontroller proceeds to step 118.

In step 118, the microcontroller 70 determines whether the return current detection input, REC, is asserted. As noted above, the XMIT terminal was driven high immediately prior to step 118. Hence, if the current within the boundary wire antenna is lagging the voltage, then the REC terminal will not be asserted when step 118 is reached. If, in step 118, the REC terminal is asserted, then the microcontroller proceeds to step 136. If the REC terminal is not asserted during step 118, then the microcontroller proceeds to step 120 to begin to determine the degree of phase lag.

In step 120, the microcontroller delays further execution for a period of about 10 µs and then proceeds to step 122.

In step 122, the microcontroller again determines whether or not the REC terminal is asserted. If the REC terminal is asserted during step 122, then the current is lagging the voltage by about 10 µs or less, which is an acceptable degree of lag. If, in step 122, the REC terminal is not asserted, then the current is lagging the voltage by more than 10 µs, and the microcontroller proceeds to step 124. If the REC terminal is asserted during step 122, the microcontroller proceeds to step 131.

In step 131, the controller delays execution for about 125 µs in order to complete the present "on" phase of the transmitter signal. Also, in step 131, the microcontroller illuminates the green LED 30c in order to eliminate any previous phase indication and to signal that the phase of the return current is within an acceptable degree of synchronization with the applied voltage. Then, the controller proceeds to step 134.

In step 134, the microcontroller turns the XMIT terminal off, and delays execution for about 27 ms in order to produce the desired 30 Hz, 25% duty cycle modulation of the carrier signal before returning to step 102.

In step 124, the microcontroller delays execution for an interval of 40 µs, then the microcontroller proceeds to step 126.

In step 126, the microcontroller again determines whether the REC terminal is asserted. If, in step 126 the REC terminal is asserted, then the current is lagging the voltage by less than about 50 µs, and the controller proceeds to step 127. If, in step 126, the REC terminal is not asserted, then the boundary wire current is lagging the applied voltage by more than 50 µs, and the microcontroller proceeds to step 128.

In step 127, the controller executes an 85 µs delay to complete the present "on" phase of the transmitter signal. Also, in step 127, the microcontroller illuminates LED 30d to indicate a moderate degree of phase lag (i.e. 50 µs or less). Then, the controller proceeds to step 134.

In step 128, the microcontroller illuminates LED 30e to indicate the maximum degree of phase lag, and executes a delay of 85 µs. Then, the controller proceeds to step 134.

At step 136, it has been determined that the boundary wire current is either synchronized with, or leading, the applied voltage. In order to assess the degree of phase lead, the controller proceeds to determine the time at which the falling edge of the return current signal occurs. In step 136, the controller executes a delay interval of 90 µs, which ends 50 µs prior to the end of the present "on" phase of the carrier signal. Then, the microcontroller proceeds to step 138.

In step 138, the microcontroller determines whether the return current detection input, REC, is asserted, in order to determine whether the current leads the voltage by 50 µs or more. If, in step 138, the REC is not asserted, meaning that the current signal has already fallen, then the microcontroller proceeds to step 140. Otherwise, execution proceeds to step 142.

In step 140, the microcontroller 70 illuminates LED 30a to indicate the maximum degree of phase lead, i.e. more than 50 µs. Also, in step 140, the microcontroller executes a 50 µs delay in order to complete the present "on" phase of the carrier signal. Then, the microcontroller proceeds to step 134.

In step 142, the microcontroller executes a delay of 40 µs, i.e. until 10 µs before the end of the present "on" phase of the transmitter signal. Then, the controller proceeds to step 146.

In step 146, the controller determines whether the return current signal is asserted, in order to detect whether the phase lead is greater than or less than 10 µs. If, in step 146, the return current signal is asserted, then the microcontroller proceeds to step 150, in order to light the green LED 30c. If, in step 146, the return current signal is not asserted, then the phase lead is between 10 µs and 50 µs, and the microcontroller proceeds to step 148 in order light LED 30b. From step 148, and from step 150, the microcontroller proceeds to step 152 to execute a delay of 10 µs, which is the remaining portion of the present "on" phase of the transmitter signal. From step 152, the microcontroller proceeds to step 134.

As can be appreciated, manual adjustment of the phase adjustment controls 32*a–c* can be eliminated in an alternative embodiment by employing the phase determination capability of the microcontroller 70 to drive an electronically-controlled switching bank (not shown) for selecting an appropriate series capacitance instead of, or in addition to, illuminating the phase indicator display LEDs 30*a–e*. In another alternative embodiment, the phase information gathered by the microcontroller 70 can be utilized to generate a drive signal for a variable capacitance circuit (not shown) connected between terminal 78 and 82.

The terms and expressions which have been employed are used as terms of description and not of limitation. There is no intention in the use of such terms and expressions of excluding any equivalents of the features shown and described or portions thereof. It is recognized, however, that various modifications are possible within the scope of the invention as claimed.

TABLE 1

| | | | |
|---|---|---|---|
| R15 | 1 Ω | C6 | .1 μF |
| R12, R13 | 2 Ω | C1 | .47 μF |
| R14 | 30 Ω | C7, C8 | 1 μF |
| R10, R11 | 51 Ω | C4, C5 | 10 μF |
| R16, R31 | 100 Ω | C2, C3 | 330 μF |
| R8, R26 | 1.1 kΩ | | |
| R3 | 2 kΩ | GT1–4 | 150 V SPARK GAP |
| R2, R7 | 3 kΩ | | |
| R9, R19, R21, R22, R30, R32 | 10 kΩ | D1, D2 | MBR150 DIODE |
| R5 | 22 kΩ | D3–5 | 1N4007 DIODE |
| R18 | 33.2 kΩ | D7 | 50 V TVS DIODE |
| R4, R23, R27, R28 | 47.5 kΩ | D8, D9, D11, D12 | 100 V TVS DIODE |

TABLE 1-continued

| | | | |
|---|---|---|---|
| R6 | 50 kΩ | D10 | 150 V TVS DIODE |
| R17 | 100 kΩ | D13 | 6.8 V ZENER DIODE |
| R20 | 332 kΩ | | |

What is claimed is:

1. A transmitter for providing a radio frequency signal to a boundary wire antenna of an animal control system, comprising:

a signal generator for generating the radio frequency signal and providing the radio frequency signal at an output terminal;

a first antenna terminal for connecting one end of the boundary wire antenna to the transmitter;

a second antenna terminal for connecting the other end of the boundary wire antenna to the transmitter;

variable reactance means for providing a variable reactance connection between the output terminal of the signal generator and the first antenna terminal;

a phase detector responsively connected with the signal generator and the second antenna terminal for detecting a phase difference between the radio frequency signal provided at the output terminal and a return signal received via the second antenna terminal; and a phase adjustor for allowing adjustment of the variable reactance means to reduce the phase difference detected by the phase detector.

* * * * *